United States Patent [19]
Hayes

[11] 3,779,901
[45] Dec. 18, 1973

[54] HYDROTREATING OF HYDROCARBONS
[75] Inventor: John C. Hayes, Palatine, Ill.
[73] Assignee: Universal Oil Products Company, Des Plaines, Ill.
[22] Filed: June 12, 1972
[21] Appl. No.: 261,892

Related U.S. Application Data
[60] Division of Ser. No. 64,643, Aug. 17, 1973, which is a division of Ser. Nos. 839,643, July 7, 1969, Pat. No. 3,607,727, which is a continuation-in-part of Ser. No. 828,762, May 28, 1969, Pat. No. 3,578,584.

[52] U.S. Cl. ................................ 208/143, 208/217
[51] Int. Cl. ............................................. C10g 23/02
[58] Field of Search ............................ 208/143, 217

[56] References Cited
UNITED STATES PATENTS
3,567,656   3/1971   Mitsche ........................ 252/466 PT

*Primary Examiner*—Curtis R. Davis
*Attorney*—James R. Hoatson, Jr. et al.

[57] ABSTRACT

A process for hydrotreating hydrocarbons and mixtures of hydrocarbons utilizing a catalytic composite of a porous carrier material, a Group VIII noble metal component and a germanium component. Applicable to charge stocks containing sulfurous compounds and aromatic hydrocarbons, the hdrotreating conditions can be controlled to effect a particular end result including the ring-opening of cyclic hydrocarbons, desulfurization, denitrification, selective olefin saturation, etc.

5 Claims, No Drawings

HYDROTREATING OF HYDROCARBONS

RELATED APPLICATIONS

The present application is a Division of my copending application, Ser. No. 064,643, filed Aug. 17, 1970. Ser. No. 064,643 was filed, to comply with a requirement for restriction, as a Division of copending application, Ser. No. 839,643, filed July 7, 1969, and issued Sept. 21, 1971 as U. S. Pat. No. 3,607,727. Ser. No. 839,643 was filed as a Continuation-In-Part of copending application, Ser. No. 828,762, filed May 28, 1969, and issued May 11, 1971 as U. S. Pat. No. 3,578,584.

All the teachings of the foregoing related applications are incorporated herein by specific reference thereto. The present application is filed to comply with a requirement for restriction in my aforesaid copending application, Ser. No. 064,643.

APPLICABILITY OF INVENTION

The present invention encompasses the use of a catalytic composite of a porous carrier material, a Group VIII noble metal component and a germanium component in the hydrotreating of hydrocarbons and mixtures of hydrocarbons. As utilized herein, the term "hydrotreating" is intended to be synonymous with the term "hydroprocessing," and involves the conversion of hydrocarbons at operating conditions selected to effect a chemical consumption of hydrogen. Included within the processes intended to be encompassed by the term "hydrotreating" are the ring-opening of cyclic hydrocarbons, hydrorefining (for nitrogen removal and olefin saturation), desulfurization (often included in hydrorefining) and hydrogenation, etc. In essence, therefore, the present invention is directed toward the removal of various contaminating influences from a variety of hydrocarbonaceous charge stocks. As will be recognized, one common attribute of these processes, and the reactions being effected therein, is that they are all "hydrogen-consuming," and are, therefore, exothermic in nature.

The individual characteristics of the foregong hydrotreating processes, including preferred operating conditions and techniques, will be hereinafter described in greater detail. The subject of the present invention is the use of a catalytic composite which has exceptional activity and resistance to deactivation when employed in a hydrogen-consuming process. Such processes require a catalyst having both a hydrogenation function and a cracking function. More specifically, the present process uses a dual-function catalytic composite which enables substantial improvements in those hydrotreating processes that have traditionally used a dual-function catalyst. The catalytic composite constitutes a porous carrier material, a Group VIII nobel metal component and a germanium component for improved activity, product selectivity and operational stability characteristics.

Catalytic composites are used to promote hydrocarbon conversion reactions such as hydrocracking, isomerization, dehydrogenation, hydrogenation, desulfurization, reforming, ring-opening, cyclization, aromatization, alkylation and transalkylation, polymerization, cracking, etc., some of which reactions are hydrogen-producing while others are hydrogen-consuming. In using the term "hydrogen-consuming," I intend to exclude those processes wherein the principal hydrogen consumption involves the saturation of light olefins, resulting from undesirable cracking, which produces the light paraffins, methane, ethane and propane. It is to the latter group of reactions, hydrogen-consuming, that the present invention is applicable. In many instances, the commercial application of these catalysts is in processes where more than one of these reactions proceed simultaneously. An example of this type of process would be the conversion of aromatic hydrocarbons into jet fuel components, principally straight, or slightly branched paraffins, wherein both ring-opening and hydrogenation are effected.

Regardless of the reaction involved, or the particular process, it is very important that the catalyst exhibit not only the capability to perform its specified functions initially, but also perform them satisfactorily for prolonged periods of time. The analytical terms employed in the art to measure how efficient a particular catalyst performs its intended functions in a particular hydrocarbon conversion process, are activity, selectivity and stability. For the purpose of discussion, these terms are conveniently defined herein, for a given charge stock, as follows: (1) activity is a measure of the ability of the catalyst to convert a hydrocarbon feed stock into products as a specified severity level, where severity level alludes to the operating conditions employed — the temperature, pressure, liquid hourly spaced velocity and hydrogen concentration; (2) selectivity refers to the weight percent or volume percent of the rectants that are converted into the desired product and/or products; (3) stability connotes the rate of change of the activity and selectivity parameters with time — obviously, the smaller rate implying the more stable catalyst. With respect to a hydrogen-consuming process, for example desulfurization, activity, stability and selectivity are similarly defined. Thus, "activity" connotes the quantity of sulfurous compounds converted into hydrogen sulfide and hydrocarbons. "Selectivity" refers to the quantity of charge stock which has been cracked to produce light, normally gaseous paraffins. "Stability" connotes the rate of change of activity and selectivity.

As is well known to those skilled in the art, the principal cause of observed deactivation or instability of a dual-function catalyst is associated with the fact that coke forms on the surface of the catalyst during the course of the reaction. More specifically, in the various hydrocarbon conversion processes, and especially those which are categorized as hydrogen-consuming, the operating conditions utilized result in the formation of high molecular weight, black, solid or semi-solid, hydrogen-poor carbonaceous material which coats the surface of the catalyst and reduces it activity by shielding it active sites from the reactants. Accordingly, a major problem facing workers in this area is the development of more active and selective catalytic composite that are not as sensitive to the presence of these carbonaceous materials and/or have the capability to suppress the rate of information of these materials at the operating conditions employed in a particular process.

I have now found a dual-function catalytic composite which possesses improved activity, selectivity and stability when employed in the hydrotreating of hydrocarbons, wherein there is effected a chemical consumption of hydrogen. In particular, I have found that the use of a catalytic composite of a Group VIII noble metal component and a germanium component with a porous carrier material improves the overall operation of these hydrogen-consuming processes. The present invention essentially involves the use of a catalyst in which a germanium component has been added to a dual-function conversion catalyst, and enables the performance characteristics of the process to be sharply and materially improved. An essential condition associated with the acquisition of this improved performance is the oxidation state of the germanium component utilized in this catalyst. As a result of my investigations, I have determined that the germanium component must be utilized in a positive oxidation state (i.e., either +2 or +4) and that the germanium component must be uniformly distributed throughout the porous carrier material. In short, the present invention essentially involves the finding that the addition of a controlled amount of a germanium component, in a positive oxidation state, to a dual-function hydrocarbon conversion catalyst containing a Group VIII noble metal component enables the performance characteristics of the catalyst to be sharply and materially improved when used in a hydrogen-consuming process.

OBJECTS AND EMBODIMENTS

An object of the present invention is to afford a process for the hydrotreating of a hydrocarbon, or mixtures of hydrocarbons. A corollary objective is to improve the selectivity and stability of hydrotreating utilizing a highly active, germanium component-containing catalytic composite.

A specific object of my invention resides in the improvement of hydrogen-consuming processes including hydrorefining, ring-opening for jet fuel production, hydrogenation, desulfurization, denitrification, etc. Therefore, in one embodiment, the present invention encompasses a process for hydrotreating a hydrocarbonaceous charge stock containing sulfurous compounds and aromatic hydrocarbons which comprises reacting said charge stock and hydrogen in a reaction zone and in contact with a catalytic composite of a Group VIII noble metal component, a germanium component combined with a porous carrier material.

In another embodiment, the process is further characterized in that the catalytic composite is reduced and sulfided prior to contacting the hydrocarbon feed stream. In still another embodiment, my invention involves a process for hydrotreating a hydrocarbonaceous charge stock containing sulfurous compounds, and aromatic and mono-olefinic hydrocarbons which comprises reacting said charge stock and hydrogen, in contact with a catalytic composite containing a germanium component and a Group VIII noble metal component combined with a porous carrier material, at reaction conditions including a maximum catalyst bed temperature in the range of from 500° F. to about 900° F. and separating the resulting reaction product effluent to recover an aromatic-rich stream substantially free from sulfurous compounds and mono-olefinic hydrocarbons.

Other objects and embodiments of my invention relate to additional details regarding preferred catalytic ingredients, the concentration of components in the catalytic composite, methods of catalyst preparation, individual operating conditions for use in the various hydrotreating processes, preferred processing techniques and the like particulars which are hereinafter given in the following, more detailed summary of my invention.

SUMMARY OF THE INVENTION

As hereinabove set forth, the present invention involves the hydrotreating of hydrocarbons and mixtures of hydrocarbons, for hydrogenation and/or contaminant removal, utilizing a particular catalytic composite. This catalyst comprises a porous carrier material having combined therewith a Group VIII noble metal component and a germanium component; in many applications, the catalyst will also contain a halogen component, and in some select applications, an alkali metal or alkaline-earth metal component. Considering first the porous carrier material, it is preferred that it be a porous, adsorptive, high-surface area support having a surface area of about 25 to about 500 square meters per gram. It is intended to include carrier materials which have traditionally been utilized in dual-function hydrocarbon conversion catalysts. In particular, suitable carrier materials are selected from the group of amorphous refractory inorganic oxides including alumina, titania, zirconia, chromia, magnesia, thoria, boria, silica-alumina, silica-magnesia, chromia-alumina, alumina-boria, alumina-silica-boron phosphate, silica-zirconia, etc. When of the amorphous type, the preferred carrier material is either a composite of alumina and silica, with silica being present in an amount of about 10.0 percent to about 90.0 percent by weight, or alumina in and of itself.

In many hydroprocessing applications of the present invention, the carrier material will constitute a crystalline aluminosilicate, often referred to as being zeolitic in nature. This may be naturally occurring, or synthetically prepared, and includes mordenite, faujasite, Type A or Type U molecular sieves, etc. When utilized as the carrier material, the zeolitic material may be in the hydrogen form, or in a form which has been treated with multi-valent cations.

As hereinabove set forth, the porous carrier material, for use in the process of the present invention, is a refractory inorganic oxide, either alumina in and of itself, or in combination with one or more other refractory inorganic oxides, and particularly in combination with silica. When utilized as the sole component of the carrier material, the alumina may be of the gamma-, eta-, or theta-alumina type, with gamma-, or eta-alumina giving the best results. In addition, the preferred carrier materials have an apparent bulk density of about 0.30 to about 0.70 gm./cc. and surface area characteristics such that the average pore diameter is about 20 to about 300 A., the pore volume is about 0.10 to about 1.0 milliliters per gram and the surface area is about 100 to about 500 square meters per gram. Whatever type of refractory inorganic oxide is employed, it may be activated prior to use by one or more treatments including drying, calcination, steaming, etc. For example, the alumina carrier may be prepared by adding a suitable alkaline reagent, such as ammonium hydroxide, to a salt of aluminum, such as aluminum chloride, aluminum nitrate, etc., in an amount to form an aluminum hydroxide gel which, upon drying and calcination, is converted to alumina. The carrier material may be formed in any desired shape such as spheres, pills, cakes, extrudates, powders, granules, etc., and may further be utilized in any desired size.

One essential constituent of the composite for use in the present invention is a germanium component, and it is an essential feature that the germanium component is present in the composite in an oxidation state above that of the elemental metal. That is to say, the germanium component necessarily exists within the catalytic composite in either the +2 or +4 oxidation state, the latter being the most likely state. Accordingly, the germanium component will be present in the composite as a chemical compound, such as the oxide, sulfide, halide, etc., wherein the germanium is in the required oxidation state, or in a chemical combination with the carrier material, in which combination the germanium exists in this higher oxidation state. On the basis of the evidence currently available, it is believed that the germanium component in the subject composite exists as germanous or germanic oxide. It is important to note that this limitation on the state of the germanium component requires extreme care in the preparation and use of the subject composite in order to insure that it is not subjected to high temperature reduction conditions (reduction at temperatures above 1,000°F.) which are effective to produce the germanium metal. This germanium component may be incorporated in the catalytic composite in any suitable manner known to the art such as by co-precipitation or cogellation with the porous carrier material, ion-exchange with the gelled carrier material, or impregnation with the carrier material, either after, or before it is dried and calcined. It is to be noted that it is intended to include within the scope of the present invention all conventional methods for incorporating a metallic component in a catalytic composite and the particular method of incorporation used is not deemed to be an essential feature of the present invention. One method of incorporating the germanium component into the catalytic composite involves co-precipitating the germanium component during the preparation of the carrier material. This method typically involves the addition of a suitable soluble germanium compound such as germanium tetrachloride to the inorganic oxide hydrosol, then combining the hydrosol with a suitable gelling agent and dropping the resultant mixture into an oil bath maintained at elevated temperatures. The droplets remain in the oil bath until they set and form hydrogel spheres. The spheres are withdrawn from the oil bath and subjected to specific aging treatments in oil and in an ammoniacal solution. The aged spheres are washed and dried at a temperature of about 200° to 400° F., and thereafter calcined at an elevated temperature of about 850° F. to about 1,300° F. Further details of spherical particle production may be found in U.S. Pat. No. 2,620,314. After drying and calcining the resulting gelled carrier material there is obtained an intimate combination of alumina and germanium oxide. A preferred method of incorporating the germanium component into the catalytic composite involves the utilization of a soluble, decomposable compound of germanium to impregnate the porous carrier material. In general, the solvent used in this impregnation step is selected on the basis of the capability to dissolve the desired germanium compound and is preferably an aqueous, or alcoholic solution. Thus, the germanium component may be added to the carrier material by comingling the latter with a solution of a suitable germanium salt or suitable compound of germanium such as germanium tetrachloride, germanium difluoride, germanium tetrafluoride, germanium di-iodide, germanium monosulfide, and the like compounds. In general, the germanium component can be impregnated either prior to, simultaneously with, or after the Group VIII noble metal component. However, I have found that excellent results are obtained when the germanium component is impregnated simultaneously with the Group VIII noble metal component. In fact, I have determined that a preferred impregnation solution contains chloroplatinic acid, hydrogen chloride, and germanous oxide dissolved in chlorine water, especially when the catalyst is intended to contain combined chlorine. Following the impregnation step, the resulting composite is dried and calcined as explained hereinafter.

Regardless of which germanium compound is used in the preferred impregnation step, it is important that the germanium component be uniformly distributed throughout the carrier material. It is preferred to use a volume ratio of impregnation solution to carrier material of at least 1.5:1 and preferably about 2:1 to about 10:1, or more. Similarly, it is preferred to use a relatively long contact time during the impregnation step ranging from about 1/4 hour up to about 1/2 hour, or more, before drying to remove excess solvent in order to insure a high dispersion of the germanium component on the carrier material. The carrier material is, likewise, preferably constantly agitated during this preferred impregnation step.

As previously indicated, the catalyst for use in the process of the present invention also contains a Group VIII noble metal component. Although the process of the present invention is specifically directed to the use of a catalytic composite containing platinum or palladium, it is intended to include other Group VIII noble metals such as rhodium, ruthenium, osmium and iridium. The Group VIII noble metal component, for example platinum, may exist within the final catalytic composite as a compound such as an oxide, sulfide, halide, etc., or in an elemental state. The Group VIII nobel metal component generally comprises about 0.01 percent to about 2.0 percent by weight of the final composite, calculated on an elemental basis. Excellent results are obtained when the catalyst contains about 0.3 percent to about 0.9 percent by weight of the Group VIII noble metal. In addition to platinum, another particularly preferred Group VIII noble metal component is palladium, or a compound of palladium.

The Group VIII noble metal component may be incorporated within the catalytic composite in any suitable manner including co-precipitation or cogellation with the carrier material, ion-exchange, or impregnation. A preferred method of preparation involves the utilization of a water-soluble compound of a Group VIII noble metal component in an impregnation technique. Thus, a platinum component may be added to the carrier material by comingling the latter with an aqueous solution of chloroplatinic acid. Other water-soluble compounds of platinum may be employed, and include ammonium chloroplatinate, platinum chloride, dinitro diamino platinum, etc. The use of a platinum chloride compound, such as chloroplatinic acid, is preferred since it facilitates the incorporation of both the platinum component and at least a minor quantity of the halogen component in a single step. In addition, it is generally preferred to impregnate the carrier material after it has been calcined in order to minimize the risk of washing away the valuable Group VIII noble metal compounds; however, in some instances it may prove advantageous to impregnate the carrier material when it exists in a gelled state. Following impregnation, the composite will generally be dried at a temperature of about 200° F. to about 400° F., for a period of from 2 to about 24 hours, or more, and finally calcined at a temperature of about 700° F. to 1,100° F., in an atmosphere of air, for a period of about 0.5 to about 10 hours.

Although not essential to successful hydroprocessing in all cases, in fact detrimental in some, a halogen component may be incorporated into the catalytic composite. Accordingly, a catalytic composite, suitable for use in at least one embodiment of the present process, comprises a combination of a Group VIII noble metal component, a germanium component and a halogen component. Although the precise form of the chemistry of the association of the halogen component with the carrier material and metallic component is not accurately known, it is customary in the art to refer to the halogen component as being combined with the carrier material, or with the other ingredients of the catalyst. The combined halogen may be either fluorine, chlorine, iodine, bromine, or mixtures thereof. Of these, fluorine and particularly chlorine are preferred for the hydrocarbon hydrotreating processes encompassed by the present invention. The halogen may be added to the carrier material in any suitable manner, and either during preparation of the carrier, or before, or after the addition of the other components. For example, the halogen may be added at any stage in the preparation of the carrier material, or to the calcined carrier material, as an aqueous solution of an acid such as hydrogen fluoride, hydrogen chloride, hydrogen bromide, hydrogen iodide, etc. The halogen component or a portion thereof may be composited with the carrier material during the impregnation of the latter with the Group VIII noble metal component. The inorganic oxide hydrosol, which is typically utilized to form an amorphous carrier material, may contain halogen and thus contribute at least a portion of the halogen component to the final composite. The quantity of halogen is such that the final catalytic composite contains about 0.1 percent to about 1.5 percent by weight, and preferably from about 0.5 percent to about 1.2 percent, calculated on an elemental basis.

With respect to the quantity of the germanium component, it is preferably about 0.01 percent to about 5.0 percent by weight, calculated on an elemental basis. Regardless of the absolute quantities of the germanium component and the platinum group component, the atomic ratio of the Group VIII noble metal to the germanium contained in the catalyst is preferably selected from the range of about 0.1:1 to about 3:1, with excellent results being achieved at an atomic ratio of about 0.5:1 to about 1.5:1. This has been found to be particularly true when the total content of the germanium component plus the Group VIII noble metal component is fixed in the range of about 0.15 to about 3.0 percent by weight. Accordingly, examples of suitable catalytic composites, considering only the Group VIII noble metal component and the germanium component are as follows:

0.5 percent by weight of germanium, 0.75 percent by weight of platinum;
0.1 percent by weight of germanium, 0.65 percent by weight of platinum;
0.375 percent by weight of germanium 0.375 percent by weight of platinum;
1.0 percent by weight of germanium, 0.5 percent by weight of platinum;
0.25 percent by weight of germanium, 0.5 percent by weight of platinum;
0.75 percent by weight of palladium, 0.5 percent by weight of germanium
0.65 percent by weight of palladium, 0.1 percent by weight of germanium;
0.375 percent by weight of palladium, 0.375 percent by weight of germanium;
0.5 percent by weight of palladium, 1.0 percent by weight of germanium; and,
0.5 percent by weight of palladium, 0.25 percent by weight of germanium.

When used in many of the hydrogen-consuming processes hereinbefore described, the foregoing quantities of metallic components will be combined with a carrier material of alumina and silica, wherein the silica concentration is 10.0 percent to about 90.0 percent by weight. In those processes wherein the acid function of the catalytic composite must necessarily be attenuated, the metallic components will be combined with a carrier material consisting essentially of alumina. In this latter situation, a halogen component is not combined with the catalytic composite, and, the inherent acid function of Group VIII noble metals is further attenuated through the addition of from 0.01 percent to about 1.5 percent by weight of an alkalinous metal component.

One such process, in which the acid function of the catalyst employed must necessarily be attenuated, is the process wherein an aromatic hydrocarbon/olefinic hydrocarbon mixture is subject to hydrogenation to produce a product stream substantially free from conjugated di-olefinic hydrocarbons and rich in aromatics. In order to avoid ring-opening which results in loss of the desired aromatic hydrocarbons, and to inhibit polymer formation, an alkalinous metal component is combined with the catalytic composite in an amount of from 0.01 percent to about 1.5 percent by weight. This component is selected from the group of lithium, sodium, potassium, rubidium, cesium, barium, strontium, calcium, magnesium, beryllium, mixtures of two or more, etc. In general, more advantageous results are achieved through the use of the alkali metal, particularly lithium and/or potassium.

In those instances where a halogen component is utilized in the catalyst, it has been determined that more advantageous results are obtained when the halogen content of the catalyst is adjusted during the calcination step through the inclusion of a halogen, or a halogen-containing compound in the air atmosphere. In particular, when the halogen component of the catalyst is chlorine, for example, it is preferred to use a mole ratio of water to hydrochloric acid of about 20:1 to about 100:1 during at least a portion of the calcination step in order to adjust the final chlorine content of the composite to a range of about 0.5 percent to about 1.2 percent by weight.

Prior to its use, the resultant calcined catalytic composite may be subjected to a substantially water-free reduction technique. This technique is designed to insure uniform and finely divided dispersion of the metallic components throughout the carrier material. Preferably, substantially pure and dry hydrogen (i.e., less than about 30.0 vol. ppm. of water) is employed as the reducing agent. The calcined catalyst is contacted at a temperature of about 800° F. to about 1,000° F., and for a period of time of about 0.5 to about 2 hours, in order to minimize the risk of reducing the germanium component, but effected to substantially reduce the Group VIII noble metal component. This reduction technique may be performed in situ as part of a start-up sequence provided precautions are observed to pre-dry the unit to a substantially water-free state.

Again, with respect to effecting hydrogen-consuming reactions, the process may be improved when the reduced composite is subjected to a presulfiding operation designed to incorporate from about 0.05 percent to about 0.50 percent by weight of sulfur, on an elemental basis, in the catalytic composite. This presulfiding treatment takes place in the presence of hydrogen and a suitable sulfur-containing compound including hydrogen sulfide, lower molecular weight mercaptans, organic sulfides, etc. The procedure constitutes treating the reduced catalyst with a sulfiding gas, such as a mixture of hydrogen and hydrogen sulfide having about 10 moles of hydrogen per mole of hydrogen sulfide, and at conditions sufficient to effect the desired incorporation of sulfur. These conditions include a temperature ranging from about 50° F. up to about 1,000° F.

According to the present invention, the hydrocarbon charge stock and hydrogen are contacted with a catalyst of the type described above in a hydrocarbon conversion, or reaction zone. The particular catalyst employed is dependent upon the characteristics of the charge stock as well as the desired end result. The contacting may be accomplished by using the catalyst in a fixed-bed system, a moving-bed system, a fluidized-bed system, or in a batch-type operation; however, in view of the risk of attrition losses of the valuable catalyst, it is preferred to use the fixed-bed system. Furthermore, it is well known that a fixed-bed catalytic system offers many operational advantages. In this type of system, a hydrogen-rich gas and the charge stock are preheated by any suitable heating means to the desired temperature, and then are passed into a conversion zone containing the fixed-bed of the catalytic composite. It is understood, of course, that the conversion zone may be one or more separate reactors having suitable means therebetween to insure that the desired conversion temperature is maintained at the entrance to each reactor. It is also to be noted that the reactants may be contacted with the catalyst bed in either upward, downward, or radial flow fashion, with the latter being preferred. Additionally, the reactants may be in the liquid phase, a mixed liquid-vapor phase, or a vapor phase when they contact the catalyst.

The operating conditions imposed upon the reaction zones are dependent upon the particular hydrotreating process being effected. However, these operating conditions will include a pressure from about 400 to about 5,000 psig., a liquid hourly space velocity of about 0.1 to about 10.0, and a hydrogen concentration within the range of about 1,000 to about 50,000 standard cubic feet per barrel. In view of the fact that the reactions being effected are exothermic in nature, an increasing temperature gradient is experienced as the hydrogen and feed stock traverses the catalyst bed. For any given process, it is desirable to maintain the maximum catalyst bed temperature below about 900° F., which temperature is virtually identical to that conveniently measured at the outlet of the reaction zone. Hydrogen-consuming processes are conducted at a temperature in the range of about 200° F. to about 900° F., and it is intended herein that the stated temperature of operation alludes to the maximum catalyst bed temperature. In order to assure that the catalyst bed temperature does not exceed the maximum allowed for a given process, the use of conventional quench streams, either normally liquid or gaseous, introduced at one or more intermediate loci of the catalyst bed, may be utilized. In some of the hydrotreating processes encompassed by the present invention, a portion of the normally liquid product effluent will be recycled to combine with the fresh hydrocarbon charge stock. In these situations, the combined liquid feed ratio (defined as volumes of total liquid charge to the reaction zone per volume of fresh feed charge to the reaction zone) will be within the range of about 1.1 to about 6.0.

Specific operating conditions, processing techniques, particular catalytic composites and other individual process details will be given in the following detailed description of the hydrotreating processes to which the present invention is applicable. These will be presented by way of an example given in conjunction with a commercially-scaled operating unit. In presenting this example, it is not intended that the invention be limited to the specific illustration, not is it intended that a given process be limited to the particular operating conditions, catalytic composite, processing techniques, charge stock, etc. It is understood, therefore, that the present invention is merely illustrated by the specifics hereinafter set forth.

EXAMPLE

One hydrocarbon hydroprocessing scheme, to which the present invention is applicable, involves the hydrorefining of coke-forming naphtha boiling range hydrocarbon distillates. These hydrocarbon distillates are generally sulfurous in nature, and contain mono-olefinic, di-olefinic and aromatic hydrocarbons. Through the utilization of a catalytic composite comprising both a germanium component and a Group VIII noble metal component, increased selectivity and stability of operation is obtained; selectivity is most noticeable with respect to the retention of aromatics, and in hydrogenating conjugated di-olefinic and mono-olefinic hydrocarbons. Such charge stocks generally result from diverse conversion processes including the catalytic and/or thermal cracking of petroleum, sometimes referred to as pyrolysis, the destructive distillation of wood or coal, shale oil retorting, etc. The impurities in these distillate fractions must necessarily be removed before the distillates are suitable for their intended use, or which when removed, enhance the value of the distillate fraction for further processing. Frequently, it is intended that these charge stocks be substantially desulfurized and saturated to the extent necessary to remove the conjugated di-olefins, while simultaneously retaining the aromatic hydrocarbons. When subjected to hydrorefining for the purpose of removing the contaminating influences, there is encountered difficulty in effecting the desired degree of reaction due to the formation of coke and other carbonaceous material.

There exist two separate, desirable routes for the treatment of coke-forming distillates, for example a pyrolysis naphtha byproduct. One such route is directed toward a product suitable for use in certain gasoline blending. With this as the desired object, the process can be effected in a single stage, or reaction zone, with the catalytic composite hereinafter specifically described as the first-stage catalyst. The attainable selectivity in this instance resides primarily in the hydrogenation of highly reactive double bonds. In the case of conjugated di-olefins, the selectivity afforded restricts the hydrogenation to produce mono-olefins, and, with respect to the styrenes, for example, the hydrogenation is inhibited to produce alkyl benzenes without "ring" saturation. The selectivity is accomplished with a minimum of polymer formation either to "gums," or lower molecular weight polymers which would necessitate a rerunning of the product before blending to gasoline would be feasible. Other advantages of restricting the hydrogenating of the conjugated di-olefins and styrenes include: lower hydrogen consumption, lower heat of reaction and a higher octane rating gasoline boiling range product effluent. Also, the non-conjugated di-olefins, such as 1,5 normal hexadiene are not usually offensive in suitably inhibited gasolines in some locales, and will not react in this first stage. Some fresh charge stocks are sufficiently low in mercaptan sulfur content that direct gasoline blending may be considered, although a mild treatment for mercaptan sulfur removal might be necessary. The considerations are generally applicable to foreign markets, particularly European, where olefinic and sulfur-containing gasolines are not too objectionable. It must be noted that the sulfurous compounds, and the mono-olefins, whether virgin, or products of di-olefin partial saturation, are unchanged in the single, or first-stage reaction zone. Where however the desired end result is aromatic hydrocarbon retention, intended for subsequent extraction, the two-state route is required. The mono-olefins must be substantially saturated in the second stage to facilitate aromatic extraction by way of currently utilized methods. Thus, the desired necessary hydrogenation involves saturation of the mono-olefins, as well as sulfur removal, the latter required for an acceptable ultimate aromatic product. Attendant upon this is the necessity to avoid even partial saturation, or ring-opening of aromatic nuclei.

With respec to one catalytic composite, its principal function involves the selective hydrogenation of conjugated di-olefinic hydrocarbons to mono-olefinic hydrocarbons. This particular catalytic composite possesses unusual stability notwithstanding the presence of relatively large quantities of sulfurous compounds in the fresh charge stock. The catalytic composite comprises an alumina-containing refractory inorganic oxide, a germanium component, a Group VIII noble metal component and an alkalinous component, the latter being preferably potassium and/or lithium. It is especially preferred, for use in this particular hydrocarbon hydroprocessing scheme, that the catalytic composite be substantially free from any "acid-acting" propensities. The catalytic composite, utilized in the second reaction zone for the primary purpose of effecting the destructive conversion of sulfurous compounds into hydrogen sulfide and hydrocarbons, is a composite of an alumina-containing refractory inorganic oxide, a Group VIII noble metal component and a germanium component. Through the utilization of a particular sequence of processing steps, and the use of the foregoing described catalytic composites, the formation of high molecular weight polymers and co-polymers is inhibited to a degree which permits processing for an extended period of time. Briefly, this is accomplished by initiating the hydrorefining reactions at temperatures below about 500° F., at which temperatures the coke-forming reactions are not promoted. The operating conditions within the second reaction zone are such that the sulfurous compounds are removed without incurring the detrimental polymerization reactions otherwise resulting were it not for the saturation of the conjugated di-olefinic hydrocarbons within the first reaction zone.

The hydrocarbon distillate charge stock, for example a light naphtha by-product from a commercial cracking unit designed and operated for the production of ethylene, having a gravity of about 34.0° API, a bromine number of about 35.0, a diene value of about 17.5 and containing about 1,600 ppm. by weight of sulfur and 75.9 vol. percent aromatic hydrocarbons, is admixed with recycled hydrogen. This light naphtha co-product has an initial boiling point of about 164° F. and an end boiling point of about 333° F. The hydrogen concentration is within the range of from about 1,000 to about 10,000 scf./bbl., and preferably in the narrower range of from 1,500 to about 6,000 scf./bbl. The charge stock is heated to a temperature such that the maximum catalyst temperature is in the range of from about 200° F. to about 500° F., by way of heat-exchange with various product effluent streams, and is introduced into the first reaction zone at an LHSV in the range of about 0.5 to about 10.0. The reaction zone is maintained at a pressure of from 400 to about 1,000 psig., and preferably at a level in the range of from 500 psig. to about 900 psig.

The temperature of the product effluent from the first reaction zone is increased to a level above about 500° F., and preferably to result in a maximum catalyst temperature in the range of 600° to 900° F. When the process is functioning efficiently, the diene value of the liquid charge entering the second catalytic reaction zone is less than about 1.0 and often less than about 0.3. The conversion of nitrogenous and sulfurous compounds, and the saturation of mono-olefins, contained within the first zone effluent, is effected in the second zone. The second catalytic reaction zone is maintained under an imposed pressure of from about 400 to about 1,000 psig, and preferably at a level of from about 500 to about 900 psig. The two-stage process is facilitated when the focal point for pressure control is the high pressure separator serving to separate the product effluent from the second catalytic reaction zone. It will, therefore, be maintained at a pressure slightly less than the first catalytic reaction zone, as a result of fluid flow through the system. The LHSV through the second reaction zone is about 0.5 to about 10.0, based upon fresh feed only. The hydrogen concentration will be in the range of from 1,000 to about 8,000 scf./bbl., and preferably from about 1,000 to about 8,000 scf./bbl. Series-flow through the entire system is facilitated when the recycle hydrogen is admixed with the fresh hydrocarbon charge stock. Make-up hydrogen, to supplant that consumed in the overall process, may be introduced from any suitable external source, but is preferably introduced into the system by way of the effluent line from the first catalytic reaction zone to the second catalytic reaction zone.

With respect to the naptha boiling range portion of the product effluent, the sulfur concentration is about 0.1 ppm., the aromatic concentration is about 75.1 percent by volume, the bromine number is less than about 0.3 and the diene value is essentially "nil."

With charge stocks having exceedingly high diene values, a recycle diluent is employed in order to prevent an excessive temperature rise in the reaction system. Where so utilized, the source of the diluent is preferably a portion of the normally liquid product effluent from the second catalytic reaction zone. The precise quantity of recycle material varies from feed stock to feed stock; however, the rate at any given time is controlled by monitoring the diene value of the combined liquid feed to the first reaction zone. As the diene value exceeds a level of about 25.0, the quantity of recycle is increased, thereby increasing the combined liquid feed ratio; when the diene value approaches a level of about 20.0, or less, the quantity of recycle diluent may be lessened, thereby decreasing the combined liquid feed ratio.

With another so-called pyrolysis gasoline, having a gravity of about 36.4° API, containing 600 ppm. by weight of sulfur, 78.5 percent by volume of aromatics, and having a bromine number of 45 and a diene value of 25.5 it is initially processed in a first reaction zone containing a catalytic composite of alumina, 0.5 percent by weight of lithium, 0.20 percent by weight of palladium and 0.375 percent by weight of germanium, calculated as the elements. The fresh feed charge rate is 3,300 bbl/day, and this is admixed with 2,475 bbl/day of the normally liquid diluent. Based upon fresh feed only, the LHSV is 2.5 and the hydrogen circulation rate is 1,750 scf/bbl. The charge is raised to a temperature of about 250° F., and enters the first reaction zone at a pressure of about 840 psig. The product effluent emanates from the first reaction zone at a pressure of about 830 psig. and a temperature of about 350° F. The effluence is admixed with about 660 scf/bbl of make-up hydrogen, and the temperature is increased to a level of about 545° F., the heated stream is introduced into the second reaction zone under a pressure of about 790 psig. The LHSV, exclusive of the recycle diluent, is 2.5, and the hydrogen circulation rate is about 1,500. The second reaction zone contains a catalyst of a composite of alumina, 0.375 percent by weight of platinum and 0.25 percent by weight of germanium. The reaction produce effluent is introduced, following its use as a heat-exchange medium and further cooling, to reduce its temperature from 620° F. to a level of 100° F., into a high-pressure separator at a pressure of about 750 psig. The normally liquid stream from the cold separator is introduced into a reboiled stripping column for hydrogen sulfide removal and depentanization. The hydrogen sulfide stripping column functions at conditions of temperature and pressure required to concentrate a $C_6$ to $C_9$ aromatic stream as a bottoms fraction. With respect to the overall product distribution, only 690 lbs./hr. of pentanes and lighter hydrocarbons is indicated in the stripper overhead. The aromatic concentrate is recovered in an amount of about 40,070 lbs./hr. (the fresh feed is 40,120 lbs./hr.); these results are achieved with a hydrogen consumption of only 660 scf/bbl. With respect to the desired product, the aromatic concentration is 78.0, the sulfur concentration is less than 1.0 ppm. by weight, and the diene value is essentially "nil."

The foregoing specification, and particularly the example, indicates the method by which the present invention is effected, and the benefits afforded through the utilization thereof.

1. I claim as my invention:

1. A process for hydrotreating a hydrocarbonaceous charge stock containing sulfurous compounds, and aromatic and mono-olefinic hydrocarbons which comprises reacting said charge stock and hydrogen, in contact with a catalytic composite containing a germanium component and a Group VIII noble metal component combined with a porous carrier material, at reaction conditions including a maximum catalyst bed temperature in the range of from 500° F. to about 900° F. and separating the resulting reaction product effluent to recover an aromatic-rich stream substantially free from sulfurous compounds and mono-olefinic hydrocarbons.

2. The process of claim 1 further characterized in that said catalytic composite contains from 0.01 percent to about 2.0 percent by weight of said Group VIII noble metal component and from 0.01 percent to about 5.0 percent by weight of said germanium component, on an elemental basis.

3. The process of claim 1 further characterized in that said catalytic composite contains from about 0.01 percent to about 1.5 percent by weight of an alkalinous metal component, on an elemental basis.

4. The process of claim 1 further characterized in that said noble metal component is palladium.

5. The process of claim 1 further characterized in that said noble metal component is platinum.

* * * * *